United States Patent
Prescott et al.

(10) Patent No.: US 9,810,345 B2
(45) Date of Patent: Nov. 7, 2017

(54) METHODS TO IMPROVE ONLINE DIAGNOSTICS OF VALVE ASSEMBLIES ON A PROCESS LINE AND IMPLEMENTATION THEREOF

(71) Applicant: Dresser, Inc., Addison, TX (US)

(72) Inventors: Robert Claude Prescott, Marshfield, MA (US); Xianren Kong, Lexington, MA (US)

(73) Assignee: Dresser, Inc., Addison, TX (US)

( * ) Notice: Subject to any disclaimer, the term of this patent is extended or adjusted under 35 U.S.C. 154(b) by 620 days.

(21) Appl. No.: 14/134,474

(22) Filed: Dec. 19, 2013

(65) Prior Publication Data

US 2015/0176722 A1 Jun. 25, 2015

(51) Int. Cl.
| | |
|---|---|
| F16K 37/00 | (2006.01) |
| G05B 19/042 | (2006.01) |
| H04L 12/873 | (2013.01) |
| G06F 17/30 | (2006.01) |
| G05B 23/02 | (2006.01) |

(52) U.S. Cl.
CPC ...... *F16K 37/0075* (2013.01); *G05B 19/0425* (2013.01); *G06F 17/30477* (2013.01); *H04L 47/52* (2013.01); *G05B 23/0283* (2013.01); *G05B 2219/33326* (2013.01); *G05B 2219/33331* (2013.01); *G05B 2219/45006* (2013.01)

(58) Field of Classification Search
CPC ... F16K 37/0075; H04L 47/50; H04L 47/823; H04L 47/52; H04L 47/522; H04L 47/524
USPC ....................... 702/33; 370/395.41
See application file for complete search history.

(56) References Cited

U.S. PATENT DOCUMENTS

| | | | |
|---|---|---|---|
| 5,687,098 A | 11/1997 | Grumstrup et al. | |
| 6,438,141 B1 * | 8/2002 | Hanko ............... | H04J 3/1682 370/252 |
| 6,977,895 B1 * | 12/2005 | Shi .................... | H04L 12/5693 370/235 |

(Continued)

FOREIGN PATENT DOCUMENTS

| | | |
|---|---|---|
| EP | 0315391 A2 | 5/1989 |
| EP | 1403745 A2 | 3/2004 |

(Continued)

OTHER PUBLICATIONS

International Search Report and Written Opinion issued in connection with corresponding PCT Application No. PCT/US2014/064748 dated Feb. 5, 2015.

*Primary Examiner* — Leslie J Evanisko
(74) *Attorney, Agent, or Firm* — Paul Frank + Collins P.C.

(57) ABSTRACT

Embodiments of a method and a system, which is configured to implement the method, to process data from one or more valve assemblies found e.g., on a process line. These embodiments can generate a listing that identifies how network/system bandwidth is allocated for the collection of data from the valve assemblies. The embodiments can also process the data to re-arrange the valve assemblies in the listing to better allocate the network/system bandwidth to certain ones of the valve assemblies that require more data to properly assess the operation of the valve assembly. In this way, further diagnostics using the data can identify any changes in operation of the valve assemblies that might be detrimental to the valve assembly and/or the process line in general.

10 Claims, 5 Drawing Sheets

(56) References Cited

U.S. PATENT DOCUMENTS

| | | | |
|---|---|---|---|
| 7,089,086 B2 | 8/2006 | Schoonover | |
| 7,177,913 B2 * | 2/2007 | Connor | H04L 12/5693 |
| | | | 709/212 |
| 7,616,642 B2 * | 11/2009 | Anke | H04L 47/10 |
| | | | 370/235 |
| 2013/0085717 A1 | 4/2013 | Selvaraj et al. | |

FOREIGN PATENT DOCUMENTS

| | | |
|---|---|---|
| EP | 1538497 A2 | 6/2005 |
| WO | WO-97/16776 | 5/1997 |

* cited by examiner

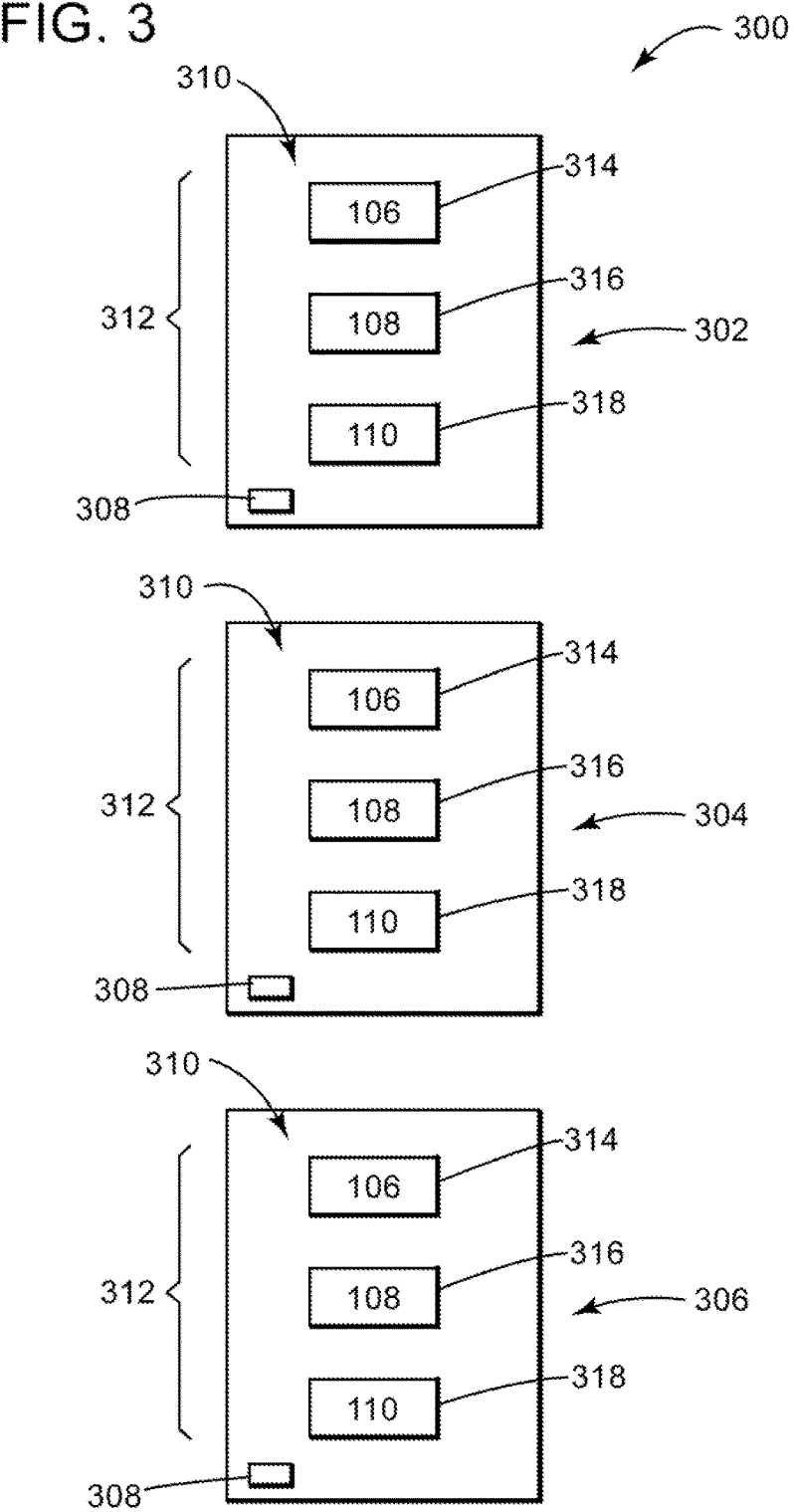

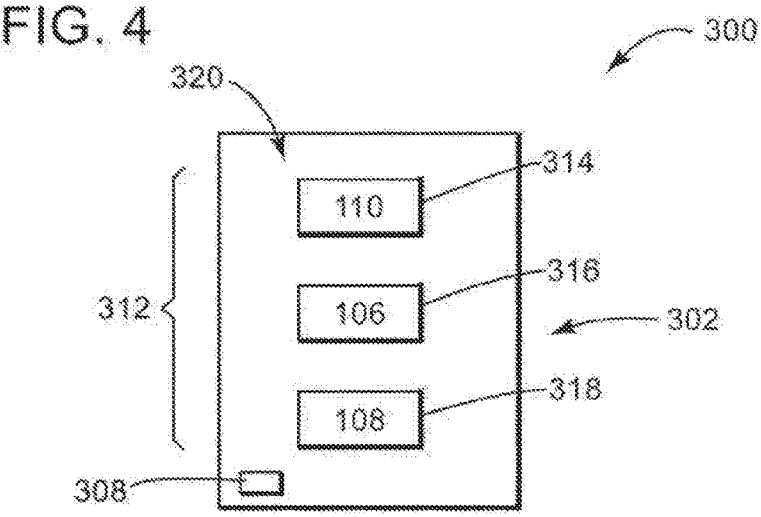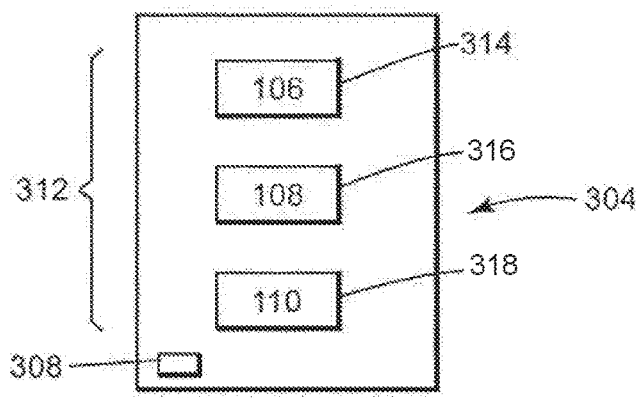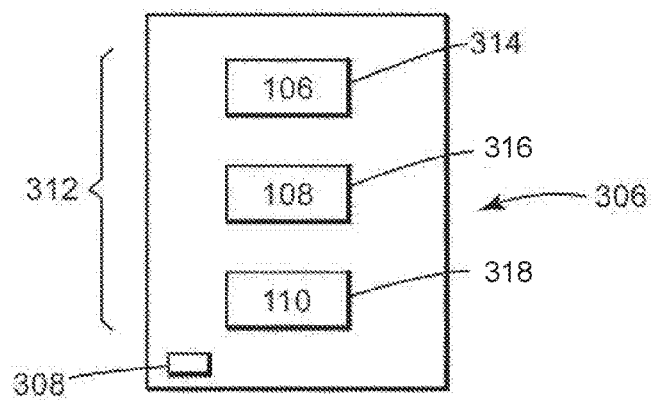

METHODS TO IMPROVE ONLINE DIAGNOSTICS OF VALVE ASSEMBLIES ON A PROCESS LINE AND IMPLEMENTATION THEREOF

BACKGROUND

The subject matter disclosed herein relates to device diagnostics, namely, in industrial process facilities, with particular discussion on techniques that improve efficiency of data collection for diagnostic testing of valve assemblies on a process line.

Industrial factories and like facilities operate process lines that may include many varieties of flow controls. Examples of these flow controls include pneumatic and electronic valve assemblies (also "control valves") that regulate a flow of process fluid (e.g., gas and liquid). In conventional configurations, these valve assemblies have a number of components that work together to regulate flow of process fluid through the valve assembly. These components include a stem, a plug, a seat, and an actuator that couples with the stem to change the position of the plug relative to the seat. The components can also include various linkages and springs that ensure proper movement, e.g., of the stem and/or the plug. In some constructions, the valve assembly incorporate a valve positioner with electrical and/or electro-pneumatic components. During operation, the valve positioner instructs the actuator to change the position of the plug relative to the seat. Often, the valve positioner issues the instructions in response to control signals from a controller, e.g., that is part of a process control system (also "distributed control system" or "DCS"). The process control system manages operation of, inter alia, the valve assemblies to achieve the process parameters for the process line.

Problems with the valve assemblies may disrupt the process and/or prevent the process line from achieving the necessary process parameters. The resulting disruptions can lower yields and reduce quality. In large refineries, chemical plants, and power plants, disruptions can also lead to significant expense from process downtime that is necessary to troubleshoot and repair the problematic devices. Thus, plant operators have an interest to detect problems before the problems manifest in ways that can hinder sustainable operation of the process line. On the other hand, plant operators are adverse to allow diagnostic techniques that would take valve assemblies offline or permit interactions with the valve assembly that induce and/or adjust the settings of the valve assembly outside of those settings prescribed for the process.

Facilities and operators may allow techniques that collect data, but that do not interrupt operation of the valve assemblies. This data may include, for example, data that relates to operative variables including setpoint, pressure, position, and like information. This data is readily available, e.g., via the DCS, the valve positioner, and/or other components in the facility. While this data is helpful, however, processes are meant to minimize variations in operating variables to maintain stability and predictability of the process output. The stability of the process requires techniques to continuously collect data from the valve assemblies to increase the likelihood that the data collected will reveal observable movement in the components of valve assembly. This movement is critical for proper diagnosis of the device using many online diagnostics and related predictive maintenance techniques. Unfortunately, the vast number of valve assemblies in use in the facility, as well as limits on bandwidth on the systems/networks to gather data, can frustrate the process of data collection. These limitations can prevent diagnostic techniques to capture enough data to identify movement or other activities of the valve assemblies, let alone to observe problems with one or more valves assemblies on the process line.

BRIEF SUMMARY OF THE INVENTION

The discussion below describes improvements that, inter alia, can offer more efficient and timely data collection and, thus, improve diagnostics of valve assemblies during operation. As set forth more herein, these embodiments can process data to generate a specific order and/or specified listing to selectively allocate network/system bandwidth to collect data from valve assemblies of the process line. This listing prioritizes certain ones of the valve assemblies over others, thus ensuring that the network/system bandwidth is allocated in a manner that increases the likelihood that data collected from the valve assemblies will reflect observable movement and/or activities of the valve assembly on the process line. As noted herein, these activities are helpful to diagnose potential problems with the devices on the process line and, ultimately, to predict the need for, and schedule maintenance on devices before these problems manifest in a manner that can affect performance of the process line.

At a relatively high level, the embodiments process data from the valve assemblies to generate a listing of the valve assemblies found, e.g., on a process line. The order of the valve assemblies in the listing corresponds with the allocation of network/system bandwidth for the collection of data. The embodiments can re-arrange the valve assemblies in the listing to better allocate the network/system bandwidth to certain ones of the valve assemblies that require more data to properly assess the operation of the valve assembly. In this way, further processing of the data can identify any changes in operation of the valve assemblies that might be detrimental to the valve assembly, the process line, and the process in general.

BRIEF DESCRIPTION OF THE DRAWINGS

Reference is now made briefly to the accompanying figures, in which:

FIG. 3 depicts a schematic diagram of an exemplary queue-based scheme that can arrange valve assemblies in a first listing for data collection;

FIG. 4 depicts a schematic diagram of the queue-based scheme that arranges valve assemblies in a second listing for data collection.

Where applicable, like reference characters designate identical or corresponding components and units throughout the several views, which are not to scale unless otherwise indicated.

DETAILED DISCUSSION

The embodiments in the discussion below address data collection issues that can frustrate, or reduce the efficacy of, efforts to perform online diagnostics of control valve assemblies during operation in a process plant. The embodiments use data that reflects operation of the valve assemblies in order to arrange the valve assemblies in a listing that allocates bandwidth on the network. The resulting listing allows the embodiments to collect data from control valve assemblies more efficiently. In one embodiment, the order identifies and prioritizes valve assemblies that are likely to yield data that relates to movement of components in the valve assembly. In this way, the embodiments improve diagnostic techniques that identify potentially problematic control valve assemblies without the need to induce movement, e.g., by issuing specific commands to the valve positioner that moves the components of the valve assembly.

Figure 1:
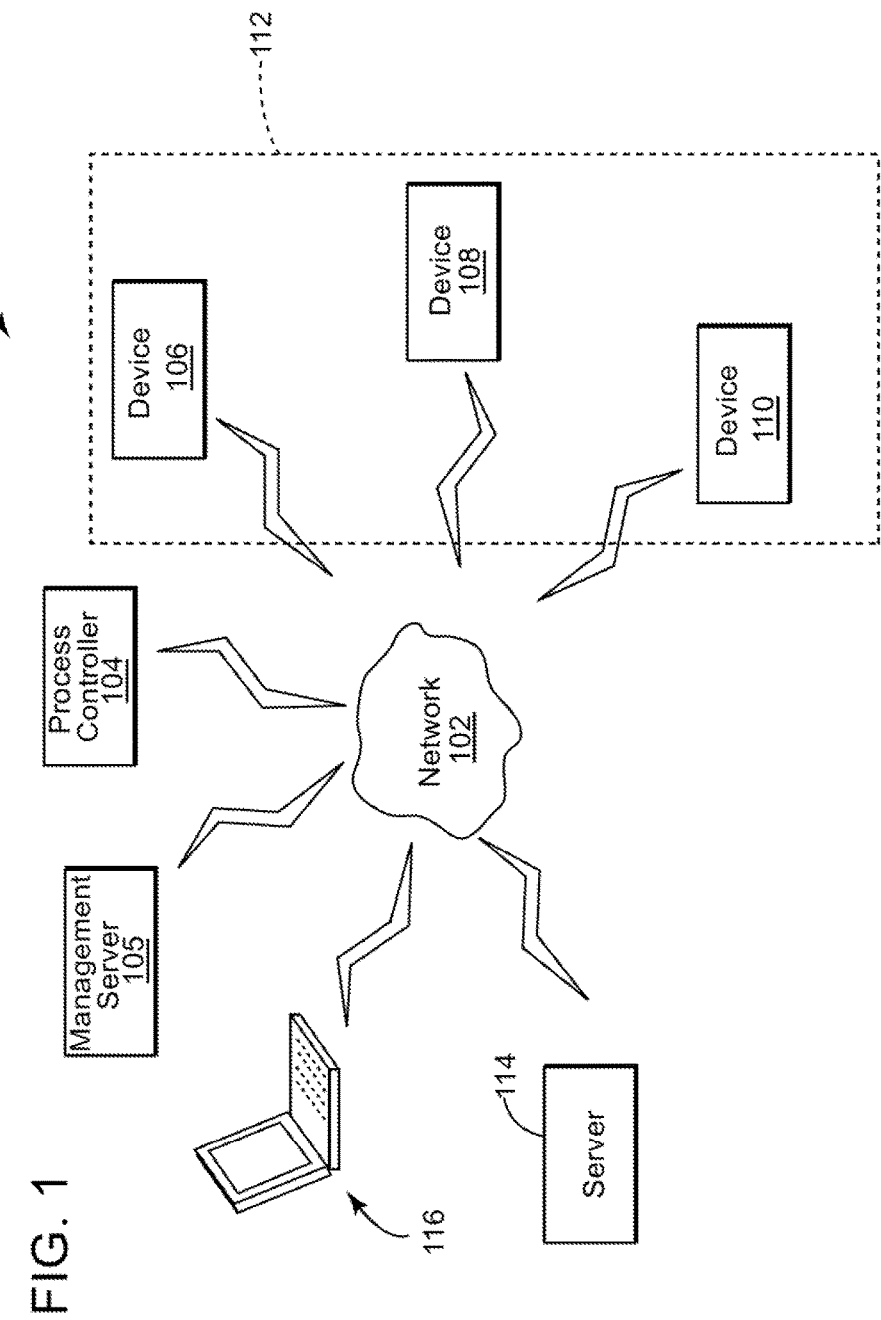
FIG. 1 depicts a schematic diagram of an exemplary embodiment of a system that can collect data from devices on a process line.

FIG. 1 depicts a schematic diagram of an exemplary system 100 that represents the components in a process facility or plant. The system 100 embodies, in a relatively high-level example, a process control system that manages, monitors, and operates processes in manufacturing and industrial settings (e.g., refining, petrochemical, pharmaceutical, etc.). The system 100 includes a network 102 that may deploy various wired and wireless constructions, as desired, to facilitate the exchange of data and information. These constructions in many facilities, for example, use HART®, FOUNDATION® Fieldbus, and like communication protocols.

The components in the system 100 may include a process controller 104, a management server 105, and one or more process devices (e.g., a first device 106, a second device 108, and a third device 110) that are part a process line 112. As contemplated herein, the process device 106, 108, 110 include control valve assemblies with components (e.g., actuator, stem, plug, etc.) that modulate flow of process fluids in the process line 112. The system 100 may also include one or more external servers (e.g., a first external server 114) that are useful for data collection and storage and other peripheral functions. The system 100 may further include one or more terminals (e.g., a first terminal 116). Examples of the terminal 116 can include a variety of computing devices (e.g., personal computers, workstations, laptop computers, tablet computers, smartphones, etc.) that an end user can utilize to interface with the process controller 104, the servers 105, 114, and/or the process devices 106, 108, 110.

The process controller 104 can be part of a distributed control system ("DCS") that issues commands over the network 102 to the process devices 106, 108, 110. For control valve assemblies, these commands can instruct the valve positioner to operate the actuator to modulate flow through the valve assembly. The management server 105 (and/or the sever 114 and terminal 116) can communicate with process devices 106, 108, 110 through the DCS or, in one example, directly via the network 102. This configuration allows the management server 105 to collect and process data to provide, among other things, overall guidance as to the operation of the process line 112 (and, in certain configurations, the operation of components of the system 100 and the process facility in general). Unlike conventional techniques, however, the management server 105 is configured to prioritize collection of data from certain ones of the process devices 106, 108, 110 over others. In this way, the system 100 can focus data collection to devices on the process line 112 that may lack sufficient data to accurately evaluate one or more of the performance indicators and/or that have performance indicators that illustrate the process device is likely to manifest problems. In some implementations, the management server 105 can de-prioritize data collection for devices with ample information to evaluate the performance indicators and/or with performance indicators.

Figure 2:
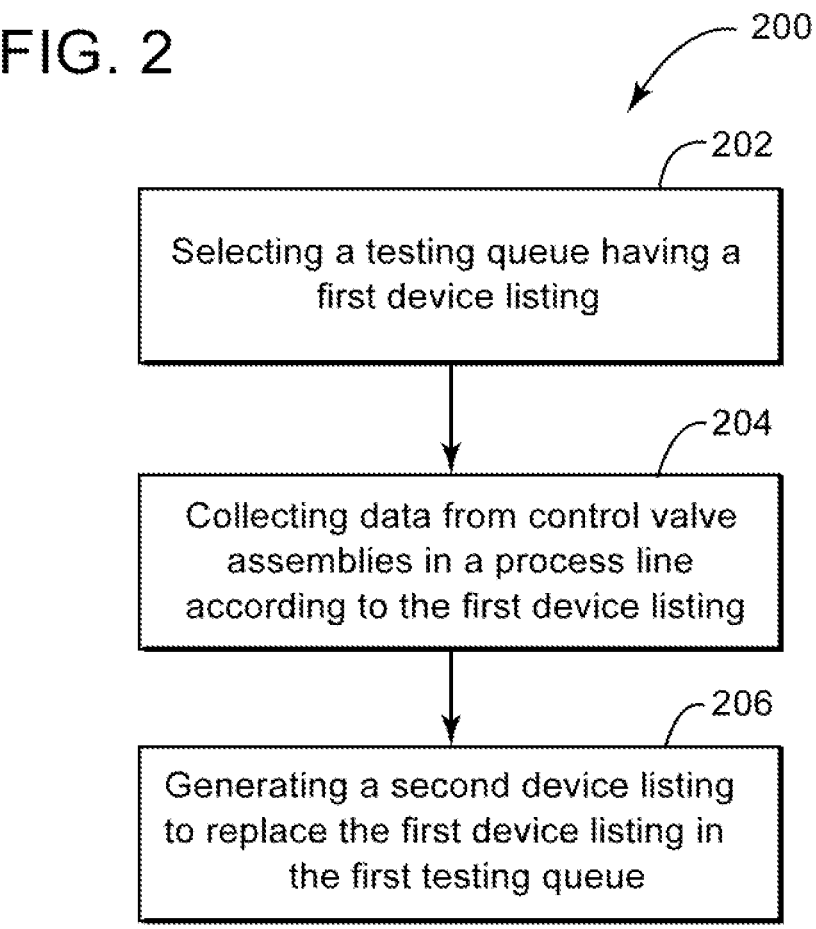
FIG. 2 depicts a flow diagram of an exemplary embodiment of a method to prioritize valve assemblies in a process facility for data collection.

FIG. 2 illustrates a flow diagram of an exemplary embodiment of a method 200 to allocate bandwidth to collect data from process devices more efficiently. The method 200 includes, at step 202, selecting a testing queue having a first device listing. The method 200 also includes, at step 204, collecting data from control valve assemblies in a process line according to the first device listing. The method 200 further includes, at step 206, generating a second device listing to replace the first device listing in the testing queue.

The step of selecting the testing queue (e.g., at step 202) may identify the testing queue from among a plurality of testing queues in a queue-based scheme. FIG. 3 illustrates a schematic diagram of an example of a queue-based scheme 300. The scheme 300 includes one or more queues (e.g., a first queue 302, a second queue 304, and a third queue 306) that have a sampling parameter 308 and a device listing 310. Examples of the device listing 310 utilize a sequential arrangement 312 with one or more device positions (e.g., a first position 314, a second position 316, and a third position 318). As shown in FIG. 3, one of the devices 106, 108, 110 can be assigned to one of the positions 314, 316, 318.

In one implementation, the method 200 may include one or more steps for utilizing the sampling parameter 308 to select a testing queue from among the testing queues 302, 304, 306. The sampling parameter 308 may correspond to a characteristic (e.g., sampling speed, sampling frequency, sampling quantity, etc.) that defines how the data is to be sampled from the devices in the queues 302, 304, 306. In other implementations, the sampling parameter 308 may correspond to behaviors of the devices 106, 108, 110 that, in turn, can instruct how the data is to be sampled from the devices in the queues 302, 304, 306. For example, the sampling parameter 308 of the queue 302 may indicate that data is to be collected to observe rapid movement in the control valve assemblies of the process line. This type of data collection may require that the sampling speed is set to capture data as fast as possible to obtain enough data to perceive movement in the device. On the other hand, the sampling parameter 308 of queue 304 may indicate that data is to be collected to observe whether movement varies over the course of time, e.g., due to diurnal thermal changes. This type of data collection may require that the sampling frequency is set to capture data at intervals over a time period that is prescribed to perceive movement of the valve that coincides with the thermal change.

The step of collecting data (e.g., at step 204) allocates bandwidth on the network according to the device listing 310. In the present example of FIG. 3, the sequential arrangement 312 will causes data to be collected from the first device 106, then the second device 108, then the third device 110. This order can denote certain factors, e.g., that the first device 106 is more likely to fail than the second device 108 and the third device 110. The particular arrangement can utilize bandwidth more efficiently; for example, the prioritization of the sequential arrangement 312 suggests that the first device 106 has a high priority (e.g., first position 314) relative to the second device 108 and the third device 110 and that the third device 110 as a lower priority (e.g., the third position 318) relative to the first device 106 and the second device 108.

The step of generating a second device listing (e.g., at step 206) re-arranges the process devices 106, 108, 110 among the positions of the device listing 310. This feature can, for example, use previously collected data (and corresponding processing and analysis of this data) to change the order in which data is collected from the process devices 106, 108, 110. FIG. 4 illustrates an example of the queue-based scheme 300 in which the first queue 302 has a second device listing 320. As shown in FIG. 4, the second device listing 320 arranges the third process device 110 in the first position 314, the first process device 106 in the second position 316, and the second process device 108 in the third position 318. By introducing these changes, the method 300 can ensure that data is collected from devices that might have limited or no data for proper analysis of performance. This feature can better deploy the available bandwidth away from devices that have known history of little or no movement (as indicate by enough data to make assumptions as to performance of the valve assembly).

Figure 5:
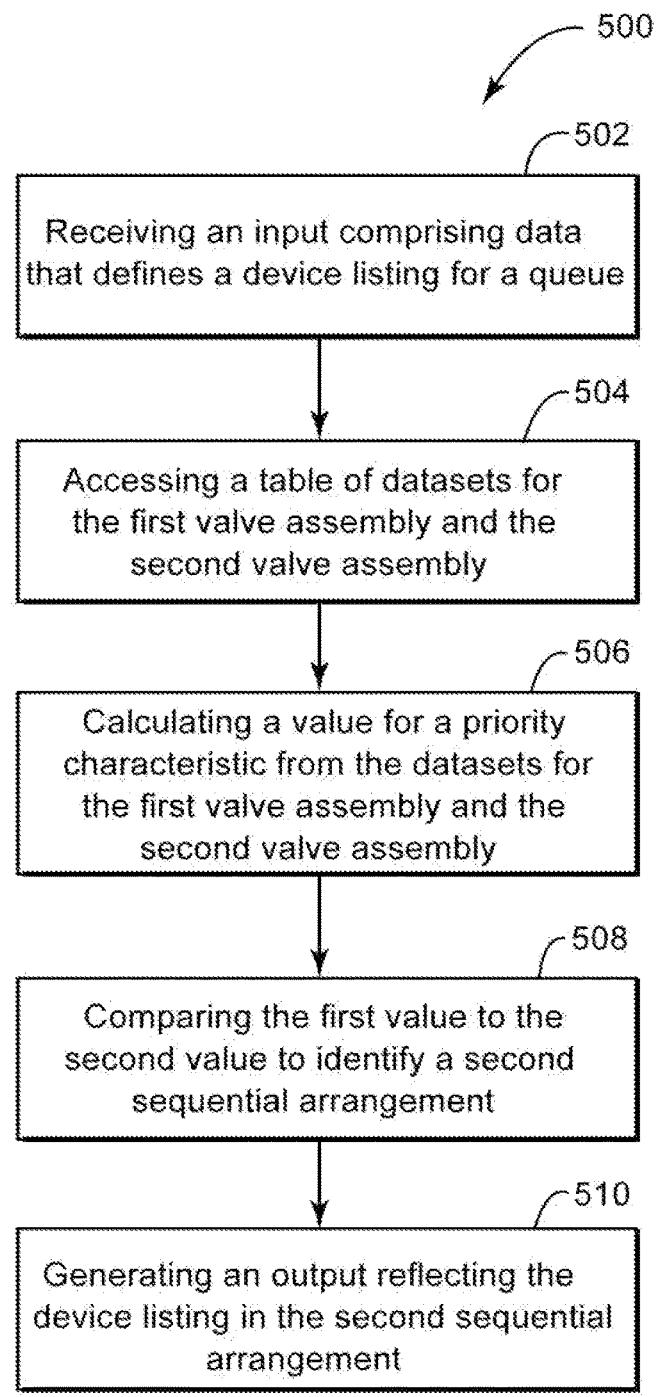
FIG. 5 depicts a flow diagram of an exemplary embodiment of a method for arranging devices in the listing of devices of FIG. 2

FIG. 5 illustrates a flow diagram of an exemplary embodiment of a method 500 that can change the position of the process devices in the device listing. In FIG. 5, the method 500 includes, at step 502, receiving an input comprising data that defines a device listing for a queue, the device listing applying a first sequential arrangement that assigns a first valve assembly to a first position in the device listing and a second valve assembly to a second position in the device listing. The method 500 also includes, at step 504, accessing a table of datasets for the first valve assembly and the second valve assembly and, at step 506, calculating a value for a priority characteristic from the datasets for the first valve assembly and the second valve assembly, the value having a first value for the first valve assembly and a second value for the second valve assembly. The method 500 further includes, at step 508, comparing the first value to the second value to identify a second sequential arrangement for the first valve assembly and the second valve assembly in the queue listing, the second sequential arrangement assigning the first position and the second position to the first valve assembly and the second valve assembly according to a position of the first value relative to the second value. The method 500 also includes, at step 510, generating an output reflecting the queue listing in the second sequential arrangement.

The step of receiving the input (e.g., at step 502) can initiate the process to reformulate the sequential arrangement of the process devices in the device listing. Examples of the input can include a signal (e.g., an digital signal, an analog signal, etc.) and/or data (also "data packet") that arrives as a result of execution of executable instructions (e.g., software, firmware, computer programs, etc.). The input can comprise data, delivered together and or serially, that represent the device listing to set out an initial priority for collection of data from the first device and the second device.

The step of accessing the table (e.g., at step 504) can retrieve data that is the result of previous data collection from the first device and the second device. This data can be found in a repository (e.g., memory) and/or like storage devices that can maintain electronic recordings of data. The data can describe one or more operating variables for the first device and the second device. These operating variables can include a setpoint (S), a position (P), an actuator pressure (AP), and a date/time stamp (T), although this disclosure contemplates that there are a wide range of other variables that comport with the concepts disclosed herein.

Table 1 below illustrates an example of data in the form of datasets that are consistent with operating variables of control valve assemblies.

TABLE 1

| Device | DS | S | P | AP | T |
|---|---|---|---|---|---|
| First device (106) | DS1, 1 | S1, 1 | P1, 1 | AP1, 1 | T1, 1 |
| First device (106) | DS1, 2 | S1, 2 | P1, 2 | AP1, 2 | T1, 2 |
| First device (106) | DS1, 3 | S1, 3 | P1, 3 | AP1, 3 | T1, 3 |
| First device (106) | ... | ... | ... | ... | ... |
| First device (106) | DS1, 99 | S1, 99 | P1, 99 | AP1, 99 | T1, 99 |
| First device (106) | DS1, 100 | S1, 100 | P1, 100 | AP1, 100 | T1, 100 |
| Second Device (108) | DS2, 1 | S2, 2 | P2, 2 | AP2, 2 | T2, 2 |
| Second Device (108) | DS2, 2 | S2, 2 | P2, 2 | AP2, 2 | T2, 2 |
| Second Device (108) | DS2, 3 | S2, 3 | P2, 3 | AP2, 3 | T2, 3 |
| Second Device (108) | ... | ... | ... | ... | ... |
| Second Device (108) | DS2, 99 | S2, 99 | P2, 99 | AP2, 99 | T2, 99 |
| Second Device (108) | DS2, 100 | S2, 100 | P2, '100 | AP2, '100 | T2, '100 |
| Third Device (110) | DS3, 1 | S3, 1 | P3, 1 | AP3, 1 | T3, 1 |
| Third Device (110) | DS3, 2 | S3, 2 | P3, 2 | AP3, 2 | T3, 2 |
| Third Device (110) | DS3, 3 | S3, 3 | P3, 3 | AP3, 3 | T3, 3 |
| Third Device (110) | ... | ... | ... | ... | ... |
| Third Device (110) | DS3, 99 | S3, 99 | P3, 99 | AP3, 99 | T3, 99 |
| Third Device (110) | DS3, 100 | S3, 100 | P3, 100 | AP3, 100 | T3, 100 |

The example shown in Table 1 illustrates that each of the devices in the device listing can have multiple datasets (e.g., DS(1,1), DS(1,2), DS(1,3) for device 106; DS(2,1), DS(2,2), DS(2,3) for device 108; and DS(3,1), DS(3,2), DS(3,3)). This number of dataset can vary. In Table 1 above, there are 100 datasets (e.g., DS(1, 100), DS(2,100), DS(3, 100) for each of the first device, the second device, and the third device.

The step of calculating the value for the priority characteristic (e.g., at step 506) can use the values for the operating variables found in datasets of the table (e.g., Table 1 above). Broadly, the priority characteristic assigns a quantitative value to the success and/or failure of the collection of datasets for each of the devices in the queue. This quantitative value affords the method 500 with a scalable feature against which to compare, e.g., the first device and the second device. As discussed above, and elaborated on more below, the scalability of the priority characteristic permits changes to the positions of the first device and the second device in the sequential arrangement to allocate bandwidth to the collect additional datasets as necessary for devices having priority in the queue.

The value of the priority characteristic for a device can be calculated according to Equation (1) below:

$$PC = W \times I_s \times I_B, \qquad \text{Equation (1)}$$

wherein PC is the priority characteristic, W is a weighting factor for a performance indicator, $I_s$ is a computation time interval that measures the time since computation of the performance indicator was last completed, and $I_B$ is an allocation time interval that measures the time since bandwidth was allocated for the device. Examples of the performance indicator include friction, spring range, lag, stick slip, and like parameters that can, in one example, be mathematically calculated from the datasets discussed herein. For several examples of such mathematical calculations, reference can be had to U.S. Pat. No. 7,089,086 to Schoonover and commonly assigned to the Assignee designated in the present application. The content of this patent is incorporated by reference in its entirety herein.

Use of the weighting factor W can rank the relative importance of individual performance indicators in relation to the other performance indicators for the device. This ranking may indicate, for example, that certain performance indicators (e.g., friction) would benefit from the addition of new datasets; thus, a higher value for the ranking of the important performance indicators can skew the overall value of the priority characteristic. Selection of the values for weighting factor W can be done arbitrarily, as shown in the example of Table 2 below:

TABLE 2

| Performance Indicator | Weighting Factor W |
|---|---|
| Friction | .25 |
| Spring Range | .12 |
| Lag | .05 |
| Stick Slip | .2 |

Along with the weighting factor W, the computation time interval $I_s$ can help to identify those performance indicators that are in need of, or would benefit from, the collection of datasets. To compute a value for the computation time interval $I_s$, the method 300 may include one or more steps for calculating the performance indicator using the operating data from the table and, if successful, assigning a first chronological indicator (e.g., a date, a time, etc.) to the present, successful calculation. The method 500 may further include steps for identifying a second chronological indicator that coincides with the last, successful calculation of the performance indicator, comparing the first chronological indicator to the second chronological indicator, and assigning the value to the computation time interval $I_s$, which in one example represents the difference between first chronological indicator and the second chronological indicator.

The allocation time interval $I_B$ is useful to prevent any one device from dominating bandwidth in the queue. As noted in Equations (1) and (2) above, the overall value of the priority characteristic PC will increase with the allocation time interval $I_B$ increases (i.e., the longer the device is not allocated bandwidth, the larger the value for the allocation time interval $I_B$). Selection of values for the allocation time interval $I_B$ can also provide chronological information (e.g., dates, times, etc.). To arrive at these values, the method 300 may include one or more steps for identifying a prior chronological indicator that allocation occurred and comparing a present chronological indicator (e.g., the date of the calculation) to the prior chronological indicator. The method 500 can also include one or more steps for assigning the value of the allocation time interval $I_B$, which in one example represents the difference between prior chronological indicator and the present chronological indicator.

Because there are a number of performance indicators that can be calculated for each device, the priority characteristic PC may incorporate more than one of the performance indicators, as calculated according to Equation (2) below:

$$PC = \begin{bmatrix} W_1 \\ W_2 \\ \ldots \\ W_i \end{bmatrix} \times \begin{bmatrix} I_{s1} \\ I_{s2} \\ \ldots \\ I_{si} \end{bmatrix} \times (I_B), \quad \text{Equation (2)}$$

wherein i identifies each of the performance indicators (i=1, 2, 3, ... n) under consideration for each of the devices that are found in the queue.

The value for priority characteristic PC may also include other variables and factors. In one implementation, the priority characteristic can be calculated according to Equation (3) below:

$$PC = \begin{bmatrix} W_1 \\ W_2 \\ \ldots \\ W_i \end{bmatrix} \times \begin{bmatrix} I_{s1} - P \\ I_{s2} - P \\ \ldots \\ I_{si} - P \end{bmatrix} \times (I_B - P), \quad \text{Equation (3)}$$

wherein P is a sampling pause, which inserts a defined period of time (e.g., seconds, minutes, hours, days, etc.) that during which no collection of datasets is required.

In one implementation, the priority characteristic can be calculated according to Equation (4) below:

$$PC = F(x) \times \left( \begin{bmatrix} W_1 \\ W_2 \\ \ldots \\ W_i \end{bmatrix} \times \begin{bmatrix} I_{s1} - P \\ I_{s2} - P \\ \ldots \\ I_{si} - P \end{bmatrix} \times (I_B - P) \right), \quad \text{Equation (4)}$$

wherein F(x) is a modifying factor, e.g., age of the valve, or some other type of function (e.g., a criticality function) that is useful to quantify the success and/or failure of the collection of datasets for each of the devices in the queue. Examples of the criticality function are useful to influence assignment of bandwidth preferentially to valve assemblies. The end user (e.g., process controller, process facility, etc.) can assign these values based on a relative assessment of the devices in the process line and/or facility. In one example, the preferential assignment may identify valve assemblies that have a higher impact on safety and/or production costs than other valves assemblies on the process line. To illustrate, a first valve assembly that regulates water for to a cafeteria may have an F(x)=0.1 and a second valve assembly that regulates water to a polyethylene polymerization reactor may have an F(x)=1.0. Thus the second valve assembly is comparatively more important and/or of higher impact than the first valve assembly.

The step of comparing the first value and the second value for the priority characteristic (e.g., at step 508) is useful to establish, or re-order, the devices in the device listing. This step can create a second sequential arrangement, which may be different from the original (or first) sequential arrangement introduced at the outset (e.g., at step 502). In one example, if the priority characteristic for the first device is larger than the priority characteristic for the second device, then the method 500 can locate the first device in the first position in the queue and locate the second device in the second position. On the other hand, this disclosure contemplates scenarios in which if the priority characteristic of the first device is less than the priority characteristic of the second device, then the method 500 can locate the second device in the first position and the first device in the second position. Still other embodiments of the method 300 may include steps for comparing the first value and the second value to a threshold criteria, identifying a deviation between the first value and the second value and the threshold criteria, and assigning positions to the first device and the second device according to the deviation. Thus, in one example, the method 500 can locate the first device and the second device in position based on the deviation, rather than the relative relationship, of the first value and the second value.

The step of generating the output (e.g., at step 510) can identify the reformulated position of the devices in the sequential arrangement. This output can be utilized during subsequent collection of datasets from the devices in one or more of the queues. Examples of the output can include a signal (e.g., an digital signal, an analog signal, etc.) and/or data (also "data packet") that instructs certain other steps and/or processes as a result of execution of executable instructions (e.g., software, firmware, computer programs, etc.).

In one embodiment, the method 500 can also include one or more steps for prioritizing one or more queues, as well. These steps can include, for example, calculating a total priority characteristic for the devices in the device listing of the queue. The steps can also include generating an average priority characteristic by, for example, dividing the total priority characteristic by the number of devices that are in the device listing of the queue. The method 500 can also include one or more steps for comparing a first value of either the total priority characteristic or the average priority characteristic of a first queue with a second value of either the total priority characteristic or the average priority characteristic for a second queue and, thereafter, rearranging the first queue and the second queue in the queue scheme, e.g., using the relationship between the first value and the second value.

One or more of the steps of the methods (e.g., methods 200, 500) can be coded as one or more executable instructions (e.g., hardware, firmware, software, software programs, etc.). These executable instructions can be part of a computer-implemented method and/or program, which can be executed by a processor and/or processing device. The processor may be part a component of the system 100 (e.g., the controller 104, the management server 105, the server 114, the terminal 116, etc.) which is adapted to execute these executable instructions, as well as to process inputs and to generate outputs, as set forth herein. For example, the software can run on the DCS system and/or as software, application, or other aggregation of executable instructions on a separate computer, tablet, lap top, smart phone, and like computing device.

Accordingly, a technical effect of embodiments of the methods, and systems implanting these methods, is to allocate bandwidth for data collection from devices on a process line. The methods can prioritize certain devices over other devices, using past and/or historical performance of the devices to determine whether the device would benefit from additional data.

Examples of a processor can integrate into the process line and/or reside remote from the process line as a stand-alone computing device, network, and like computing arrangement. The memory and the processor can include hardware that incorporates with other hardware (e.g., circuitry) to form a unitary and/or monolithic unit devised to execute computer programs and/or executable instructions (e.g., in the form of firmware and software). In other examples, these devices integrate, in whole or in part, with components of the process device (e.g., devices 106, 108, 110 of FIG. 1) and/or process line (e.g., process line 112 of FIG. 1) as part of the hardware and/or software configured on such hardware.

Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Moreover, as will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer readable medium may be a computer readable signal medium or a computer readable storage medium. A non-transitory computer readable signal medium may include a propagated data signal with computer readable program code embodied therein, for example, in baseband or as part of a carrier wave. Such a propagated signal may take any of a variety of forms and any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

The invention has been described in detail with particular reference to certain preferred aspects thereof, but it will be understood that variations, combinations, and modifications can be effected by a person of ordinary skill in the art within the spirit and scope of the invention. Examples of variations, combinations, and modifications that are intended to be within the scope of the claims are those having structural elements that do not differ from the literal language of the claims and those including equivalent structural elements with insubstantial differences from the literal language of the claims.

What is claimed is:

1. A method for allocating bandwidth to collect data from valve assemblies on a process line, comprising:
   at a process controller having a processor with access to executable instructions stored on a memory, the process controller part of a distributed control system that operates valve assemblies on a process line:
      receiving an input comprising data that defines a device listing for a queue, the device listing applying a first sequential arrangement that assigns positions to valve assemblies found on a process line, the valve assemblies comprising a first valve assembly and a second valve assembly, wherein the first sequential arrangement assigns the first valve assembly to a first position in the device listing and the second valve assembly to a second position in the device listing;

accessing a table of datasets for the first valve assembly and the second valve assembly;

calculating a value for a priority characteristic from the datasets for the first valve assembly and the second valve assembly, the value for the priority characteristic quantifying success or failure to evaluate performance of each of the first valve assembly and the second valve assembly based on previously collected datasets, the value having a first value for the first valve assembly and a second value for the second valve assembly;

comparing the first value to the second value to identify a second sequential arrangement for the first valve assembly and the second valve assembly in the device listing, the second sequential arrangement assigning the first position and the second position to the first valve assembly and the second valve assembly according to a position of the first value relative to the second value;

generating an output reflecting the device listing having the second sequential arrangement; and using the output, operating the distributed control system, connected to the first valve assembly and the second valve assembly, to issue commands to the first valve assembly and the second valve assembly so as to retrieve datasets according to the second sequential arrangement of the device listing, wherein the output indicates bandwidth allocated on the distributed control system to collect additional datasets in sequence prioritized according to the valve assembly found at the first position and the valve assembly found at the second position in the second sequential arrangement.

2. The method of claim 1, wherein the table of datasets comprises data collected previously from the first valve assembly and the second valve assembly.

3. The method of claim 2, wherein the data identifies one or more operating variables for the first valve assembly and the second valve assembly.

4. The method of claim 1, wherein the priority characteristic assigns a quantitative value describing the datasets for the first valve assembly and the second valve assembly.

5. The method of claim 1, wherein the priority characteristic is calculated according to, $PC = W \times I_S \times I_B$, wherein PC is the priority characteristic, W is a weighting factor for a performance indicator that describes operation of the valve assembly, $I_S$ is a computation time interval that measures time since computation of the performance indicator was last completed, and $I_B$ is an allocation time interval that measures time since bandwidth was allocated for one or more of the first valve assembly and the second valve assembly.

6. The method of claim 5, further comprising:

for each of the first valve assembly and the second valve assembly,
assigning a first chronological indicator to a first calculation of the performance indicator;
identifying a second chronological indicator that coincides with a second calculation of the performance indicator;
comparing the first chronological indicator to the second chronological indicator; and
assigning a value to the computation time interval $I_S$,
wherein the value represents a difference between the first chronological indicator and the second chronological indicator.

7. The method of claim 5, further comprising:

for each of the first valve assembly and the second valve assembly,
identifying a prior chronological indicator that indicates that allocation of bandwidth occurred for one or more of the first valve assembly and the second valve assembly;
comparing a present chronological indicator to the prior chronological indicator; and
assigning the value of the allocation time interval $I_B$,
wherein the value represents a difference between the prior chronological indicator and the present chronological indicator.

8. The method of claim 1, further comprising identifying the queue from among a plurality of queues in a queue-based scheme.

9. The method of claim 8, further comprising utilizing a sampling parameter to select the queue from among the plurality of queues, wherein the sampling parameter corresponds to a characteristic that defines how the data is to be sampled from the first valve assembly and the second valve assembly.

10. A method of claim 9, wherein the sampling parameter identifies an operating behavior for the first valve assembly and the second valve assembly.

* * * * *